US012038883B2

(12) United States Patent
Raghava et al.

(10) Patent No.: US 12,038,883 B2
(45) Date of Patent: Jul. 16, 2024

(54) DISTRIBUTED STORAGE SYSTEM WITH MACHINE LEARNING MODEL FOR SELECTING A HASH FUNCTION TO MAP A DATA ITEM TO A STORAGE DEVICE

(71) Applicant: RED HAT, INC., Raleigh, NC (US)

(72) Inventors: Veera Raghava, Bangalore (IN); Sunil Angadi, Karnataka (IN)

(73) Assignee: Red Hat, Inc., Raleigh, NC (US)

(*) Notice: Subject to any disclaimer, the term of this patent is extended or adjusted under 35 U.S.C. 154(b) by 100 days.

(21) Appl. No.: 17/841,851

(22) Filed: Jun. 16, 2022

(65) Prior Publication Data
US 2023/0409537 A1    Dec. 21, 2023

(51) Int. Cl.
  *G06F 16/182* (2019.01)
  *G06N 3/08* (2023.01)
(52) U.S. Cl.
  CPC ............ *G06F 16/182* (2019.01); *G06N 3/08* (2013.01)
(58) Field of Classification Search
  CPC .................................. G06F 16/182; G06N 3/08
  USPC ......................................................... 707/747
  See application file for complete search history.

(56) References Cited

U.S. PATENT DOCUMENTS

| | | | | |
|---|---|---|---|---|
| 4,464,713 A | * | 8/1984 | Benhase | G06F 12/0871 711/205 |
| 7,965,297 B2 | | 6/2011 | Hoppe | |
| 8,762,399 B2 | | 6/2014 | Calvignac et al. | |
| 9,697,226 B1 | * | 7/2017 | Youngworth | G06F 3/0655 |
| 10,417,192 B2 | * | 9/2019 | Darcy | G06F 16/182 |
| 10,713,589 B1 | * | 7/2020 | Zarandioon | G06N 20/00 |
| 10,853,146 B1 | * | 12/2020 | Talayco | H04L 67/1097 |
| 11,080,265 B2 | * | 8/2021 | Kreutzer | H04L 67/1097 |
| 11,100,073 B2 | * | 8/2021 | Hsiao | G06F 16/278 |
| 11,425,009 B2 | * | 8/2022 | Vasseur | G06N 5/04 |
| 2018/0011851 A1 | * | 1/2018 | Xiu | G06N 20/00 |
| 2018/0032910 A1 | * | 2/2018 | Shibahara | G06N 7/00 |
| 2019/0138502 A1 | * | 5/2019 | Gowdappa | G06F 16/182 |
| 2019/0312795 A1 | * | 10/2019 | Karve | H04L 67/10 |
| 2019/0384845 A1 | * | 12/2019 | Saxena | G06F 16/24545 |
| 2021/0019406 A1 | * | 1/2021 | Chistyakov | G06F 21/566 |
| 2021/0314404 A1 | * | 10/2021 | Glek | G06F 11/2041 |

(Continued)

FOREIGN PATENT DOCUMENTS

CN    102880724 A    1/2013

OTHER PUBLICATIONS

Oh, Myoungwon, et al., "Design of Global Data Deduplication for A Scale-out Distributed Storage System", 2018 IEEE 38th Conf. on Distributed Computing Systems (ICDCS), Vienna, Austria, Jul. 2-6, 2018, pp. 1063-1073.*

(Continued)

*Primary Examiner* — Robert Stevens
(74) *Attorney, Agent, or Firm* — Kilpatrick Townsend & Stockton LLP (57) ABSTRACT

One example described herein includes a system that can receive values for performance factors associated with a distributed storage system. The system can provide the values as input to a machine-learning model configured to select a hash function from among a set of hash functions based on the values and generate an output indicating the hash function. The system can then configure the distributed storage system to map a data item to a storage device using the hash function.

18 Claims, 4 Drawing Sheets

(56) References Cited

U.S. PATENT DOCUMENTS

2021/0334206 A1* 10/2021 Colgrove ............. G06F 3/0638
2023/0342221 A1* 10/2023 Brener-Shalem ...... G06N 20/00

OTHER PUBLICATIONS

Li, Peilun, et al., "Optimizing Hash-based Distributed Storage Using Client Choices", APSys '16, Hong Kong, Hong Kong, Aug. 4-5, 2016, Article 10, pp. 1-8.*

Zheng, Fei, et al., "A New Data Placement Approach for Heterogeneous Ceph Storage", Proc. Of the 9th International Conference on Computer Engineering and Networks (CENet 2019), Advances in Intelligent Systems and Computing (ASIC, vol. 1143), First Online: Jul. 1, 2020, pp. 601-609.*

Xu, Liangliang, et al., "Deterministic Data Distribution for Efficient Recovery in Erasure-Coded Storage Systems", IEEE Transactions on Parallel and Distributed Systems, vol. 31, No. 10, Oct. 2020, pp. 2248-2262.*

Honicky, R. J., et al., "Replication Under Scalable Hashing: A Family of Algorithms for Scalable Decentralized Data Distribution", IPDPS 2004, Santa Fe, NM, Apr. 26-30, 2004, 10 pages.*

Tan et al., "Learning to Hash with Graph Neural Networks for Recommender Systems", https://arxiv.org/pdf/2003.01917.pdf, Mar. 4, 2020; pp. 1-11.

Bettilyon, Tyler Elliot, "An Introduction to Hashing in the Era of Machine Learning", https://blog.bradfieldcs.com/an-introduction-to-hashing-in-the-era-of-machine-learning-6039394549b0; pp. 1-24, Jun. 16, 2022.

Aggarwal, Ani, "Performance of Hash Implementations on Various Workloads," https://medium.com/geekculture/performance-of-hash-implementations-on-various-workloads-fedac579a39b; pp. 1-27, Jun. 16, 2022.

Rahim et al., "Data Collision Prevention with Overflow Hashing Technique in Closed Hash Searching Process", 2017 J. Phys.: Conf Ser. 930, Jan. 20, 2012; pp. 1-6.

\* cited by examiner

DISTRIBUTED STORAGE SYSTEM WITH MACHINE LEARNING MODEL FOR SELECTING A HASH FUNCTION TO MAP A DATA ITEM TO A STORAGE DEVICE

TECHNICAL FIELD

The present disclosure relates generally to distributed storage systems. More specifically, but not by way of limitation, this disclosure relates to a distributed storage system with a machine learning model that can select a hash function, from among a group of candidate hash functions, for use in mapping data items to storage devices.

BACKGROUND

A distributed storage system can include multiple storage devices in communication with each other over a network for synchronizing, coordinating, and storing data items. The storage devices can work together so that the distributed storage system behaves as one storage system. Distributed storage systems can implement block storage, file storage, or object storage techniques to store data items. Data items can include data objects, data files, or any other data structures that are capable of storing data.

DETAILED DESCRIPTION

A distributed storage system can receive data items from users and store the data items in storage devices. The distributed storage system can use a hash function to map the data items to their respective storage devices. Mapping a data item to a storage device can involve determining that the data item is already stored in the storage device or is to be stored in the storage device. But, in conventional distributed storage systems, the hash function generally remains static (unchanged) throughout the lifecycle of the distributed storage system. A static hash function can perform poorly for certain storage devices or certain states of the distributed storage system. For example, using the same hash function all the time can diminish a speed at which the distributed storage system can map data items to storage devices. As a result of the diminished mapping speed, the distributed storage system may generate more requests for certain resources and may poll the storage devices more frequently. Therefore, mapping the data items with a fixed hash function to the storage devices can introduce latency, and can consume excessive amounts of computing resources like network bandwidth.

Certain aspects and features of the present disclosure can overcome one or more of the abovementioned problems by providing a machine learning model configured to select a hash function, from among a group of candidate hash functions, based on performance factors associated with a distributed storage system. The distributed storage system can then be configured to use the selected hash function to map data items to storage devices of the distributed storage system. For example, the distributed storage system can use the selected hash function to determine a storage device at which to write each data item received from a user. Different hash functions can be selected and implemented at different points in time, depending on the performance characteristics of the distributed storage system at those different points in time. Using these techniques, the distributed storage system can be dynamically configured to use the optimal hash function at a given point in time based on the current performance of the distributed storage system. Over time, the hash function can be dynamically changed in response to changes in the distributed storage system's performance. These optimizations may improve the overall operation of the distributed storage system.

In some examples, the machine learning model can accept performance factors as inputs and provide a selected hash function as an output. The performance factors can include any quantities that impact the performance of the distributed storage system. Examples of performance factors can include storage factors, such as a number of storage devices associated with the distributed storage system, types of storage devices associated with the distributed storage system, or a topological configuration of the storage devices associated with the distributed storage system. The performance factors can also include network factors associated with the distributed storage system. Examples of network factors can include a network latency, network topology, and network bandwidth associated with the distributed storage system. The performance factors can also include workload-related performance factors, such as the number of workloads, types of workloads, and complexity of the workloads associated with the distributed storage system.

As noted above, the machine learning model can select a hash function from a set of hash functions based on the performance factors. In response to selecting the hash function, the machine learning model can generate an output indicating the hash function. In some examples, the machine learning model can include an unsupervised machine-learning method that can be executed without prior training with a training dataset. In other examples, the machine learning model can include a supervised machine-learning technique that can be trained on training data to improve the accuracy of the machine learning model. The training data can include a set of labeled observations. Each labeled observation can include an input-output pair. The input can include one or more values for one or more of the performance factors. The output can include a target hash function that is to be selected (from a set of candidate hash functions) based on the one or more values of the one or more performance factors. The training data can have hundreds or thousands of such labeled observations (e.g., input-output pairs), which can be used to train the machine learning model using one or more supervised learning techniques.

After the machine learning model selects a hash function, the distributed storage system can configure itself to use the selected hash function to map the data items to the storage devices. For example, the distributed storage system can include a variable that can determine which hash function to use to map the data items to the storage devices. The distributed storage system can modify the variable's value based on the output of the machine learning model, thereby configuring itself to use the hash function selected by the machine learning model to map the data items to the storage devices.

Configuring the distributed storage system to use a hash function that is dynamically selected by the machine learning model and adjustable based on performance factors can improve the overall performance of the distributed storage system. For example, it can decrease an amount of processing time and computing resources required to complete certain operations. For example, the dynamically selected hash function can decrease the processing time and the consumption of computing resources that may be associated with writing data items to storage devices associated with a static hash function. Additionally or alternatively, the hash function can decrease a processing time and a consumption of computing resources associated with reading data items from storage devices that may be associated with the static hash function.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
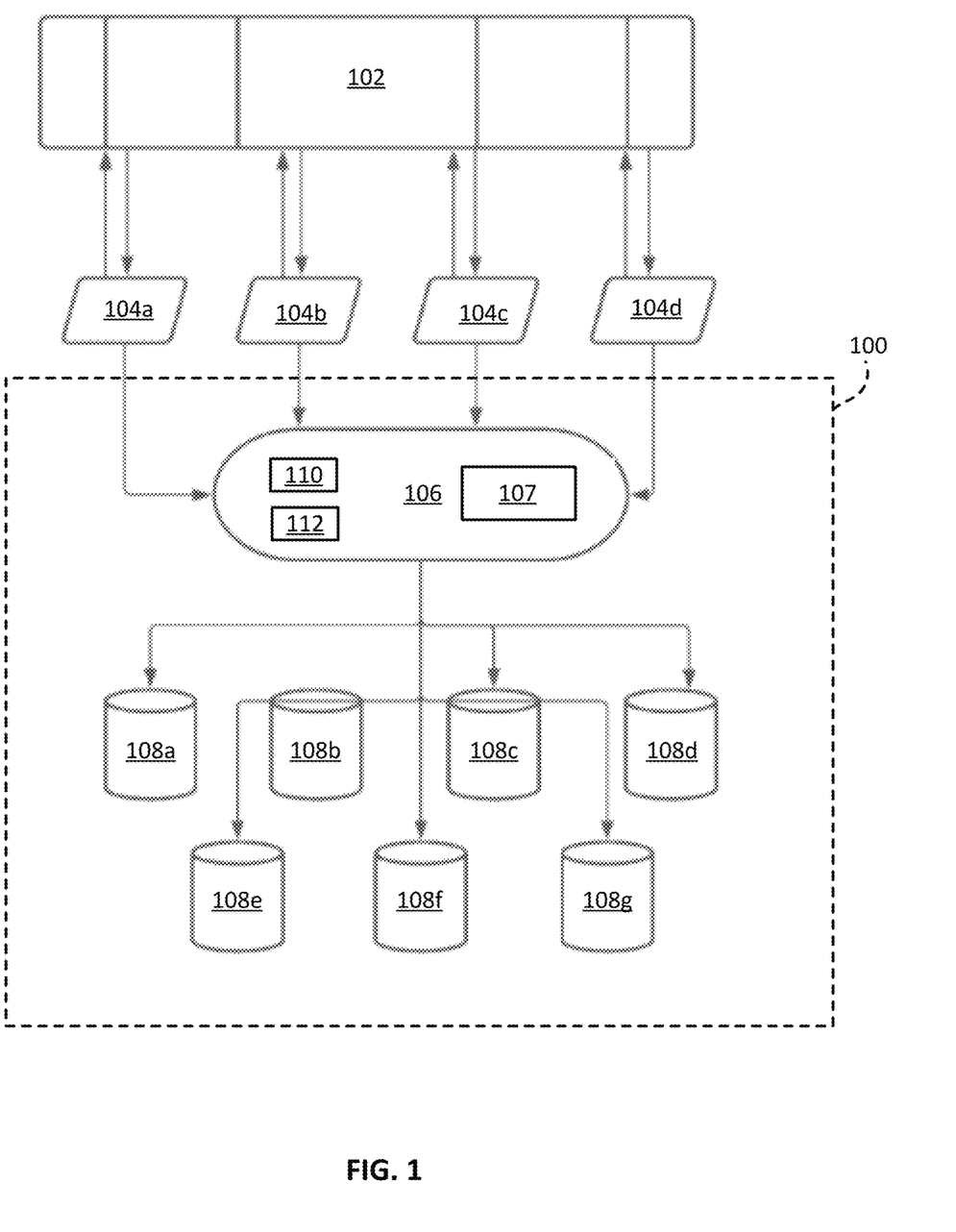
FIG. 1 is a block diagram of an example of a process for selecting a hash function for a distributed storage system using a machine learning model according to some aspects of the present disclosure.

FIG. 1 is a block diagram of an example of a process for selecting a hash function for a distributed storage system 100 using a machine learning model according to some aspects of the present disclosure. The distributed storage system 100 can receive read requests and write requests from a software application 102 for reading and writing data items 104*a-d*, respectively. The software application 102 may be part of the distributed storage system 100 or may be separate from the distributed storage system. For example, the software application 102 can represent one or more software applications residing on one or more client devices that are communicatively coupled to the distributed storage system 100.

The distributed storage system 100 can include a mapping module 106 that can receive the read and write requests. The mapping module 106 can then identify the appropriate storage devices 108*a-g* for servicing the read and write requests. Examples of the storage devices 108*a-g* can include hard drives, solid state drives, flash drives, or any other suitable devices for storing data. To determine the appropriate storage device to service a read request or a write request, the mapping module 106 may use a hash function 110.

In some examples, the particular hash function 110 used by the mapping module 106 can be dynamically changed over time depending on the performance of the distributed storage system 100. For example, the mapping module 106 can include a machine learning model 107. The machine learning model 107 can receive performance factors associated with the distributed storage system 100. Based on the performance factors, the machine learning model 107 can select a hash function 110 from a set of candidate hash functions 112. Each hash function in the set of hash functions 112 can be used to map the data items 104*a-d* to the storage devices 108*a-g* in a different way than the other hash functions. Examples of the hash functions 112 can include a linear hashing algorithm, a prime-number hashing algorithm, a pseudo-random hashing algorithm, a controlled replication under scalable hashing (CRUSH) algorithm, or any other suitable hash functions. The machine learning model 107 can provide an output to the mapping module 106 indicating the selected hash function 110. The mapping module 106 can then use the selected hash function 110 to handle subsequent read and write requests.

In some examples, the machine learning model 107 can include a deep neural network. The deep neural network can include an input layer that can receive the values for the performance factors. The deep neural network can also include one or more hidden layers for processing the values and adjusting weights associated with the deep neural network. The deep neural network can also include an output layer that can identify, based on the values for the performance factors, which hash function 110 to use to map the data items 104*a-d* to the storage devices 108*a-g*. Other types of machine learning models may additionally or alternatively be used in other examples.

In some examples, it may be desirable to re-train the machine learning model 107 depending on its performance level. For example, the distributed storage system 100 can include a training engine. The training engine can determine a current value of a performance metric indicating a performance level of the distributed storage system 100. One example of such a performance metric can include an average speed at which data is read or written from some or all of the storage devices 108*a-g* in the distributed storage system 100. The current value of the performance metric can be associated with the performance of the distributed storage system 100 while using a particular hash function 110 selected by the machine learning model 107. The training engine can compare the current value of the performance metric to a reference value for the performance metric. The reference value can indicate a second performance level of the distributed storage system 100 while not using the particular hash function 110 selected by the machine learning model 107 (e.g., while using a different hash function). The training engine can then calculate a difference between the current value and the reference value. The difference may suggest that the performance of the distributed storage system 100 improved, remained the same, or decreased by using the selected hash function 110. The training engine can generate feedback data based on the comparison result and then use the feedback data to re-train the machine learning model 107. For example, the training engine can adjust weights or parameters associated with the machine learning model 107 based on the feedback data. This feedback loop can help the machine learning model 107 improve its selection of hash functions over time.

Figure 2:
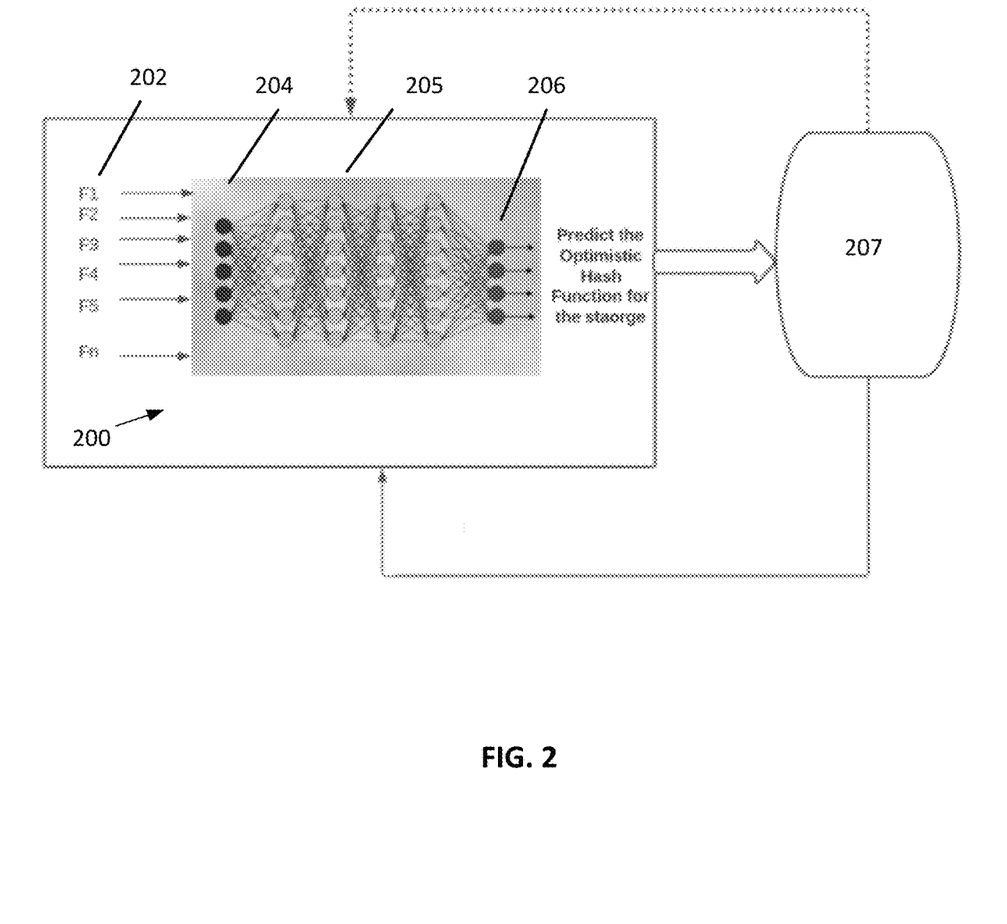
FIG. 2 is a block diagram of an example of a machine learning model that can select a hash function for a distributed storage system according to some aspects of the present disclosure.

FIG. 2 is a block diagram of an example of a machine learning model that can select a hash function for a distributed storage system 207 according to some aspects of the present disclosure. The distributed storage system 207 can include one or more storage devices that can store one or more data items. In this example, the machine learning model is a neural network 200.

The neural network 200 can include an input layer 204 that can receive inputs 202. The inputs 202 can include values for performance factors associated with the distributed storage system 207. The neural network 200 may be configured to receive any number and combination of inputs 202 (e.g., values for any number and combination of performance factors).

The neural network 200 can also include one or more hidden layers 205. The hidden layers 205 can process data provided to them by the input layer 204 or a previous hidden layer 205. In the example shown in FIG. 2, the neural network 200 includes four hidden layers 205. But any appropriate number and combination of hidden layers 205 may be used.

The neural network 200 can include an output layer 206 that can indicate a hash function usable to map data items to storage devices in the distributed storage system 207. In some examples, the output layer 206 may have multiple output nodes that can be assigned weight values by the neural network 200 based on the inputs 202. Each output node may correspond to a hash function. The output node that is assigned the highest weight may correspond to the hash function selected by the neural network 200 as being most optimal based on the inputs 202.

As mentioned above, in some examples the neural network 200 can be updated over time using a feedback loop to improve its performance. This feedback loop is represented in FIG. 1 by the arrows. As part of the feedback loop, a training engine (which may be internal or external to the distributed storage system 207) can determine a performance metric associated with the distributed storage system 207 when the selected hash function is in use. Based on the performance metric, the training engine can adjust weights or parameters associated with the neural network 200 to further train the neural network 200. Further training the neural network 200 can improve the performance of the neural network 200. Improving the performance of the neural network 200 can improve the quality of the hash function selection, which in turn can improve the performance of the distributed storage system 207.

The neural network 200 is illustrative and non-limiting. Other examples may include a machine learning model that has a different arrangement of nodes and layers. The machine learning model may also be another type of model, other than a neural network, in other examples. In some examples, the machine learning model can include an unsupervised learning algorithm. The unsupervised learning algorithm can identify patterns in unlabeled data. In some examples, the unsupervised learning algorithm can determine a pattern based on the values of the performance factors. Based on the pattern, the unsupervised learning algorithm can select an optimal hash function for mapping data to storage devices. The machine learning model can generate an output indicating the hash function. In some examples, the machine learning model can include a k-means clustering algorithm, a nearest-neighbors algorithm, an agglomerative clustering algorithm, or any other suitable unsupervised learning algorithm. In some examples, the machine learning model can include supervised learning algorithm. For example, the machine learning model can include a support vector machine, a naïve Bayesian model, a random forest model, or any other suitable supervised learning algorithm. In some examples the machine learning model can include an ensemble of multiple machine learning models.

Figure 3:
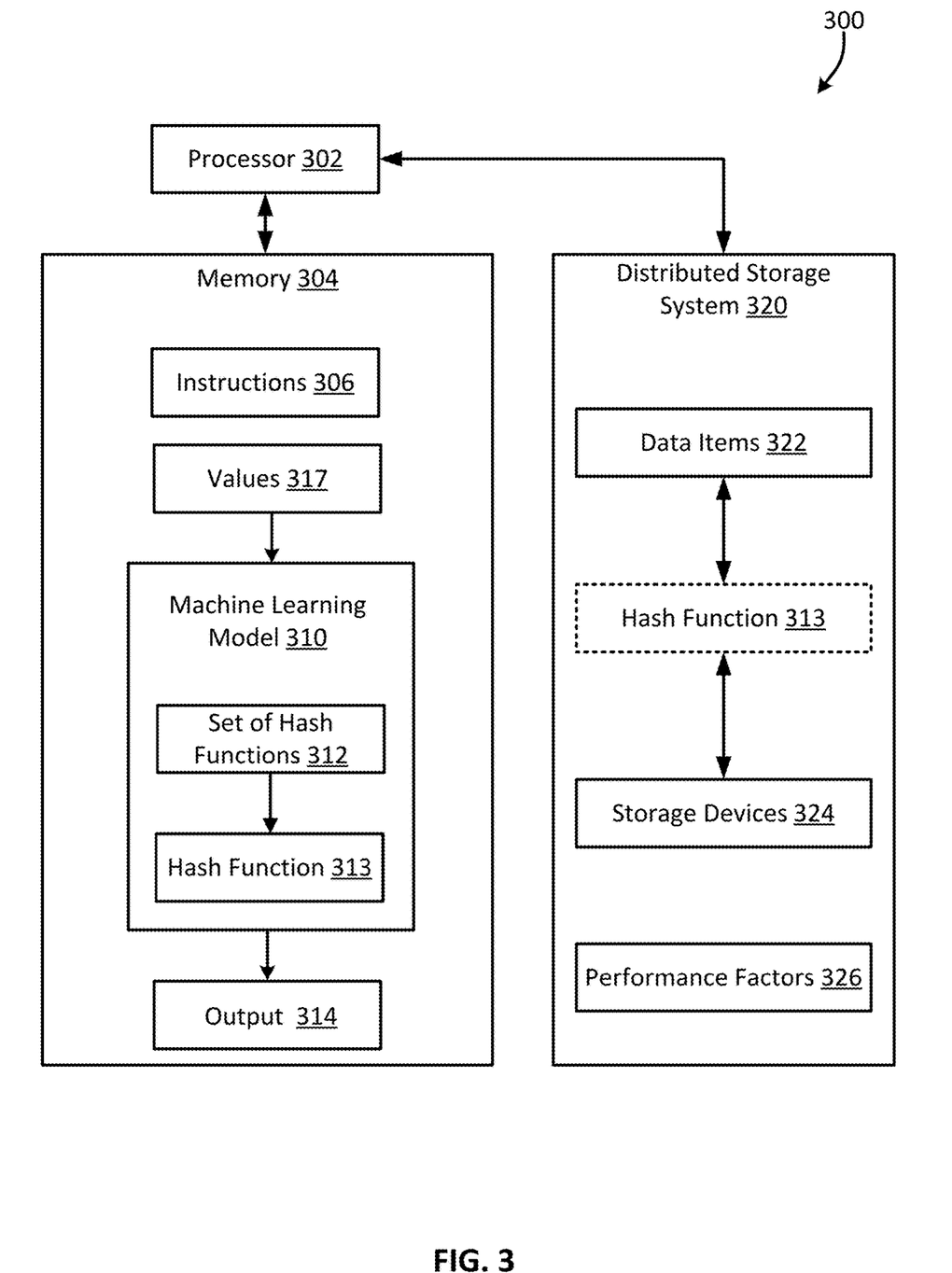
FIG. 3 is a block diagram of an example of a system for selecting a hash function for a distributed storage system using machine learning according to some aspects of the present disclosure.

FIG. 3 is a block diagram of an example of a system 300 for selecting a hash function 313 for a distributed storage system 320 using machine learning according to some aspects of the present disclosure. The system 300 can include a processor 302 and a memory 304. The processor 302 and memory 304 can be integrated into a single housing or can be distributed from one another.

The processor 302 can include one processor or multiple processors. Non-limiting examples of the processor 302 include a Field-Programmable Gate Array (FPGA), an application-specific integrated circuit (ASIC), or a microprocessor. The processor 302 can execute instructions 306 stored in the memory 304 to perform one or more operations. In some examples, the instructions 306 can include processor-specific instructions generated by a compiler or an interpreter from code written in any suitable computer-programming language, such as C, C++, C#, or Java.

The memory 304 can include one memory device or multiple memory devices. The memory 304 can be volatile or non-volatile, in that the memory 304 can retain stored information when powered off. Non-limiting examples of the memory 304 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processor 302 with the instructions 306 or other program code. Non-limiting examples of a computer-readable medium include magnetic disks, memory chips, ROM, random-access memory (RAM), an ASIC, a configured processor, optical storage, or any other medium from which a computer processor can read the instructions 306.

The processor 302 can be communicatively coupled to a distributed storage system 320. In some examples, the processor 302 may be part of the distributed storage system 320. In other examples, the processor 302 can be separate from the distributed storage system 320 and communicatively coupled to the distributed storage system 320 via one or more networks, such as the Internet. The distributed storage system 320 can store data items 322. The data items 322 can include data of arbitrary size. In some examples, the data items 322 can include large amounts of data. The distributed storage system 320 can map the data items 322 to the storage devices 324 via a hash function 313. The hash function 313 that is used to map the data items 322 to the storage devices 324 can impact the performance of the distributed storage system 320. Different hash functions may impact the performance differently.

In some examples, the processor 302 can receive values 317 for performance factors 326 associated with a distributed storage system 320. In some examples, the performance factors 326 can indicate resource utilization and associated costs. The processor 302 can provide the values 317 as input to a machine learning model 310 configured to select a hash function 313 from among a plurality of hash functions 312 based on the values 317 and generate an output indicating the hash function 313. The processor 302 can then configure the distributed storage system 320 to map data items 322 to storage devices 324 using the hash function 313.

Figure 4:
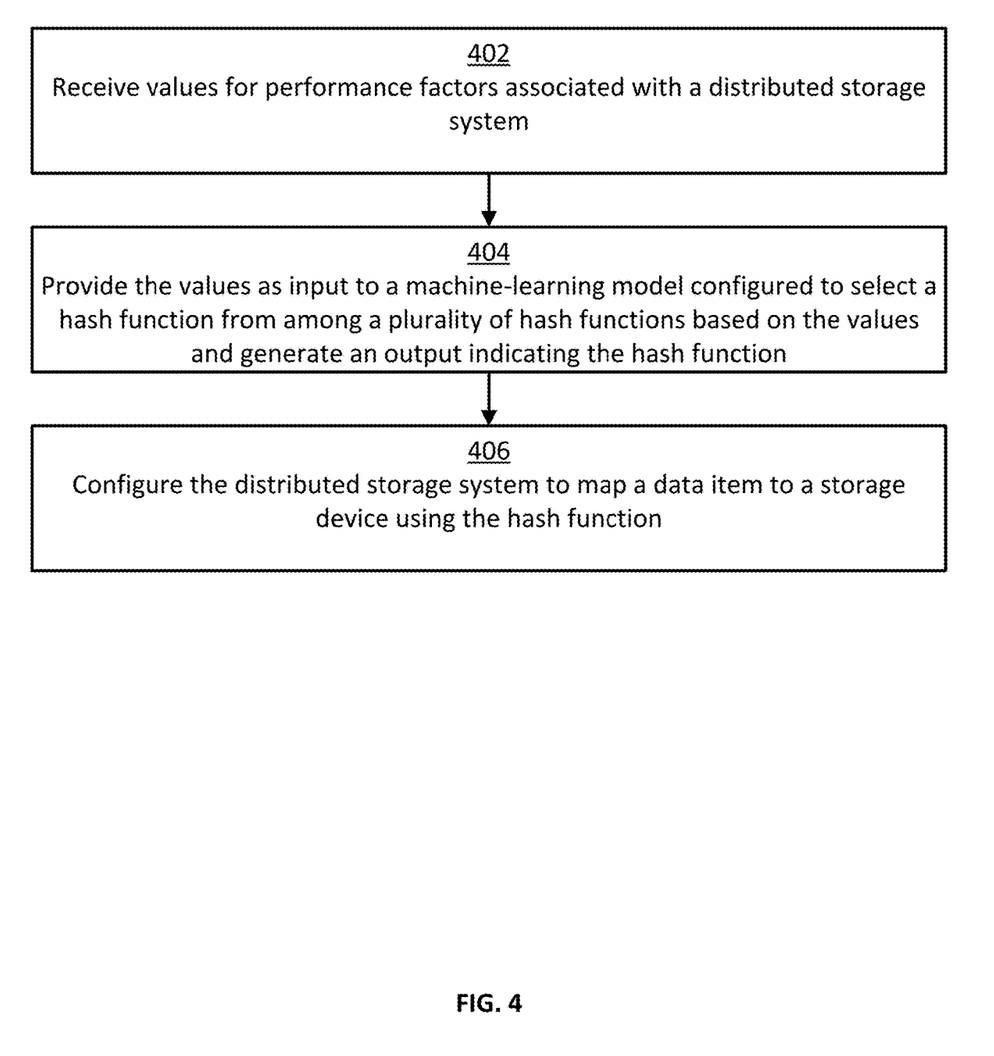
FIG. 4 is a flow chart of an example of a process for selecting a hash function for a distributed storage system using machine learning according to some aspects of the present disclosure.

FIG. 4 is a flow chart of an example of a process for selecting a hash function 313 for a distributed storage system 320 using machine learning according to some aspects of the present disclosure. Other examples may include more steps, fewer steps, or different steps than are shown in FIG. 4. The steps of FIG. 4 will now be described below with reference to the components of FIG. 3 described above.

At block 402, the processor 302 can receive values 317 for performance factors 326 associated with a distributed storage system 320. The performance factors 326 can indicate a level of performance of the distributed storage system 320. The performance factors 326 can include resource utilization and associated costs. In some examples, the performance factors 326 can include storage factors, such as a number of storage devices 324 associated with the distributed storage system 320, types of storage devices 324 associated with the distributed storage system 320, or a topological configuration of the storage devices 324 associated with the distributed storage system 320. The performance factors 326 can also include network factors, such as a network latency, network topology, and network bandwidth associated with the distributed storage system 320. The performance factors 326 can also include workload factors, such as the number of workloads, types of workloads, and complexity of the workloads associated with the distributed storage system 320.

At block 404, the processor 302 can provide the values 317 as input to a machine learning model 310. The machine learning model 310 can select a hash function 313 from among a set of hash functions 312 based on the values 317 of the performance factors 326 and generate an output 314 indicating which hash function 313 to use. Each hash function in the set of hash functions 312 can map a data item 322 to a storage device 324 using different algorithms or techniques, and can thereby result in different levels of performance for different states of the distributed storage system 320. Examples of the hash functions 313 can include a linear hashing algorithm, a prime-number-hashing algorithm, a pseudo-random hashing algorithm, a controlled replication under scalable hashing (CRUSH) algorithm, or any other suitable hash function 313.

At block 406, the processor 302 can configure the distributed storage system 320 to map the data item 322 to the storage device 324 using the hash function. For example, the processor 302 can issue a command to the distributed storage system to modify a variable in the distributed storage system 320. The variable can indicate which hash function 313 the distributed storage system 320 is to be used to map the data item 322 to the storage device 324. Additionally or alternatively, the processor 302 can modify a permission or a flag associated with the hash function 313 to enable the hash function 313. Once enabled, the hash function 313 can be used to map the data item 322 to the storage device 324. In some examples, the processor 302 can transmit the output of the machine learning model 310 to the distributed storage system 320 for causing the distributed storage system 320 to implement the hash function 313.

After configuring the distributed storage system 320 to use the selected hash function 313, the distributed storage system 320 can then actually use the selected hash function 313 to map the data item 322 to the storage device 324. For example, the distributed storage system 320 can receive a request from a client device for writing the data item 322 to the distributed storage system 320. The distributed storage system 320 can use the selected hash function 313 to determine at which storage device 324 to store the data item 322. The distributed storage system 320 can then write the data item 322 to that storage device 324.

Additionally or alternatively, the distributed storage system 320 can receive a request from a client device to read a data item 322 that may be stored on a storage device 324 on the distributed storage system 320. The distributed storage system 320 can use the selected hash function 313 to determine at which storage device 324 the data item is stored. The distributed storage system 320 can then retrieve the data item 322 from the storage device 324 and transmit the data item 322 to the client device.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising program code that is executable by a processor for causing the processor to:
   receive values for performance factors associated with a distributed storage system;
   provide the values as input to a machine-learning model configured to select a hash function from among a plurality of hash functions based on the values and generate an output indicating the hash function, wherein the machine-learning model is a deep neural network that includes an input layer configured to receive the values and an output layer configured to identify which hash function of the plurality of hash functions was selected by the machine-learning model based on the values; and
   configure the distributed storage system to map a data item to a storage device using the hash function.

2. The non-transitory computer-readable medium of claim 1, wherein the performance factors include at least one storage factor, at least one network factor, and at least one workload factor.

3. The non-transitory computer-readable medium of claim 1, wherein each hash function in the plurality of hash functions is configured to map data items to storage devices in a different way than the other hash functions in the plurality of hash functions.

4. The non-transitory computer-readable medium of claim 3, wherein the plurality of hash functions include at least two hashing algorithms selected from a group of hashing algorithms consisting of: a linear hashing algorithm, a prime-number hashing algorithm, a pseudo-random hashing algorithm, and a controlled replication under scalable hashing (CRUSH) algorithm.

5. The non-transitory computer-readable medium of claim 1, further comprising program code that is executable by the processor for causing the processor to, prior to providing the values as input to the machine-learning model:
   receive training data that includes a plurality of labeled observations, each labeled observation in the plurality of labeled observations including a respective set of values for the performance factors correlated to a target hash function from among the plurality of hash functions; and
   train the machine-learning model using a supervised learning technique based on the training data.

6. The non-transitory computer-readable medium of claim 1, further comprising program code that is executable by the processor for causing the processor to, subsequent to applying the hash function for mapping the data item to the storage device:
   determine a current value for a performance metric, the current value indicating a performance level of the distributed storage system when using the hash function;
   compare the current value for the performance metric to a reference value for the performance metric to generate a comparison result, the reference value indicating another performance level of the distributed storage system when not using the hash function;
   generate feedback data based on the comparison result; and
   train the machine-learning model using the feedback data.

7. A method comprising:
receiving, by a processor, training data that includes a plurality of relationships between hash functions and performance-factor values, each relationship in the plurality of relationships including a correlation between a respective hash function of a plurality of hash functions and a respective set of values for performance factors associated with a distributed storage system;
training, by the processor, a machine-learning model using a supervised learning technique based on the training data;
receiving, by the processor, values for the performance factors associated with the distributed storage system;
providing, by the processor, the values as input to the machine-learning model, wherein the machine-learning model is configured to select a hash function from among the plurality of hash functions based on the values and generate an output indicating the hash function; and
configuring, by the processor, the distributed storage system to map a data item to a storage device using the hash function.

8. The method of claim 7, wherein the performance factors include at least one storage factor and at least one network factor.

9. The method of claim 7, wherein each hash function in the plurality of hash functions is configured to map data items to storage devices in a different way than the other hash functions in the plurality of hash functions.

10. The method of claim 9, wherein the plurality of hash functions include at least two hashing algorithms selected from a group of hashing algorithms consisting of: linear hashing, prime-number hashing, pseudo-random hashing, and controlled replication under scalable hashing.

11. The method of claim 7, wherein the machine-learning model is a deep neural network that includes an input layer configured to receive the values and an output layer configured to identify which hash function of the plurality of hash functions was selected by the machine-learning model based on the values.

12. The method of claim 7, further comprising, subsequent to applying the hash function for mapping the data item to the storage device:
determining, by the processor, a current value for a performance metric, the current value indicating a performance level of the distributed storage system when using the hash function;
comparing, by the processor, the current value for the performance metric to a reference value for the performance metric to generate a comparison result, the reference value indicating another performance level of the distributed storage system when not using the hash function;
generating, by the processor, feedback data based on the comparison result; and training, by the processor, the machine-learning model using the feedback data.

13. A system comprising:
a processor; and
a memory that includes instructions executable by the processor for causing the processor to:
receive values for performance factors associated with a distributed storage system;
provide the values as input to a machine-learning model configured to select a hash function from among a plurality of hash functions based on the values and generate an output indicating the hash function;
configure the distributed storage system to map a data item to a storage device using the hash function; and
subsequent to applying the hash function for mapping the data item to the storage device:
determine a current value for a performance metric, the current value indicating a performance level of the distributed storage system when using the hash function;
compare the current value for the performance metric to a reference value for the performance metric to generate a comparison result, the reference value indicating another performance level of the distributed storage system when not using the hash function:
generate feedback data based on the comparison result; and
train the machine-learning model using the feedback data.

14. The system of claim 13, wherein the performance factors include at least one storage factor.

15. The system of claim 13, wherein each hash function in the plurality of hash functions is configured to map data items to storage devices in a different way than the other hash functions in the plurality of hash functions.

16. The system of claim 15, wherein the plurality of hash functions include at least two hashing algorithms selected from a group of hashing algorithms consisting of: linear hashing, prime-number hashing, pseudo-random hashing, and controlled replication under scalable hashing.

17. The system of claim 13, wherein the memory further comprises instructions executable by the processor for causing the processor to, prior to providing the values as input to the machine-learning model:
receive training data that includes a plurality of labeled observations, each labeled observation in the plurality of labeled observations including a respective set of values for the performance factors correlated to a target hash function from among the plurality of hash functions; and
train the machine-learning model using a supervised learning technique based on the training data.

18. The system of claim 13, wherein the machine-learning model is a deep neural network that includes an input layer configured to receive the values and an output layer configured to identify which hash function of the plurality of hash functions was selected by the machine-learning model based on the values.

* * * * *